United States Patent [19]

Taylor, Sr.

[11] 4,138,303

[45] Feb. 6, 1979

[54] METHOD OF FORMING SCREEN PACKS

[76] Inventor: John J. Taylor, Sr., Box 43, Hopewell, N.J. 08525

[21] Appl. No.: 789,761

[22] Filed: Apr. 21, 1977

[51] Int. Cl.$^2$ .................................................. B32B 31/00
[52] U.S. Cl. ................................ 156/264; 29/163.5 F; 55/524; 156/285; 156/309; 210/499; 210/506; 428/138; 428/256; 428/245
[58] Field of Search ............... 156/250, 306, 264, 309, 156/285, 324; 427/247, 295, 289; 264/92, 248, 93, 273; 428/64, 114, 105, 138, 109, 247, 255, 256; 55/524; 210/499, 506, 348; 29/163.5 F

[56] References Cited

U.S. PATENT DOCUMENTS

| | | | |
|---|---|---|---|
| 1,625,508 | 4/1927 | Thorne | 156/88 |
| 2,032,923 | 3/1936 | Eldridge | 264/93 |
| 2,367,490 | 1/1945 | Ducklo | 156/265 |
| 2,425,235 | 8/1947 | Ferrante | 55/524 |
| 2,607,954 | 8/1952 | Schneider et al. | 264/176 R |
| 2,679,090 | 5/1954 | Farr | 29/163.5 F |
| 2,787,570 | 4/1957 | Lott et al. | 428/255 |
| 3,043,738 | 7/1962 | Demeter et al. | 156/285 |
| 3,239,401 | 3/1966 | Beery | 156/306 |
| 3,297,461 | 1/1967 | Siddall | 428/256 |
| 3,306,800 | 2/1967 | Plueddemann | 156/329 |
| 3,630,384 | 12/1971 | Todd | 210/506 |
| 3,659,402 | 5/1972 | Alliger | 210/499 |
| 3,687,764 | 8/1972 | Rogosch et al. | 156/309 |
| 3,792,519 | 2/1974 | Haver | 156/250 |
| 3,900,629 | 8/1975 | Spencer | 29/163.5 F |

*Primary Examiner*—Douglas J. Drummond
*Assistant Examiner*—J. J. Gallagher

[57] ABSTRACT

The disclosure concerns a technique for forming screen packs which may be used in filtering foreign matter from an extruded plastic material. Such technique involves initially forming a sandwich array which includes a number of sheets of screening, each sheet of screening having a desired orientation with respect to each other sheet of screening. The sandwich array also includes at least one sheet of thermoplastic material. The sandwich array is heated, in order to cause the thermoplastic material to flow into the openings in the sheets of screening, such that the sandwich array will constitute a unitary structure upon the cooling of the thermoplastic material. Thereafter, at least one screen pack, and preferably several screen packs are formed from such unitary structure, e.g., through the performance of a suitable punching operation on the unitary structure.

7 Claims, 4 Drawing Figures

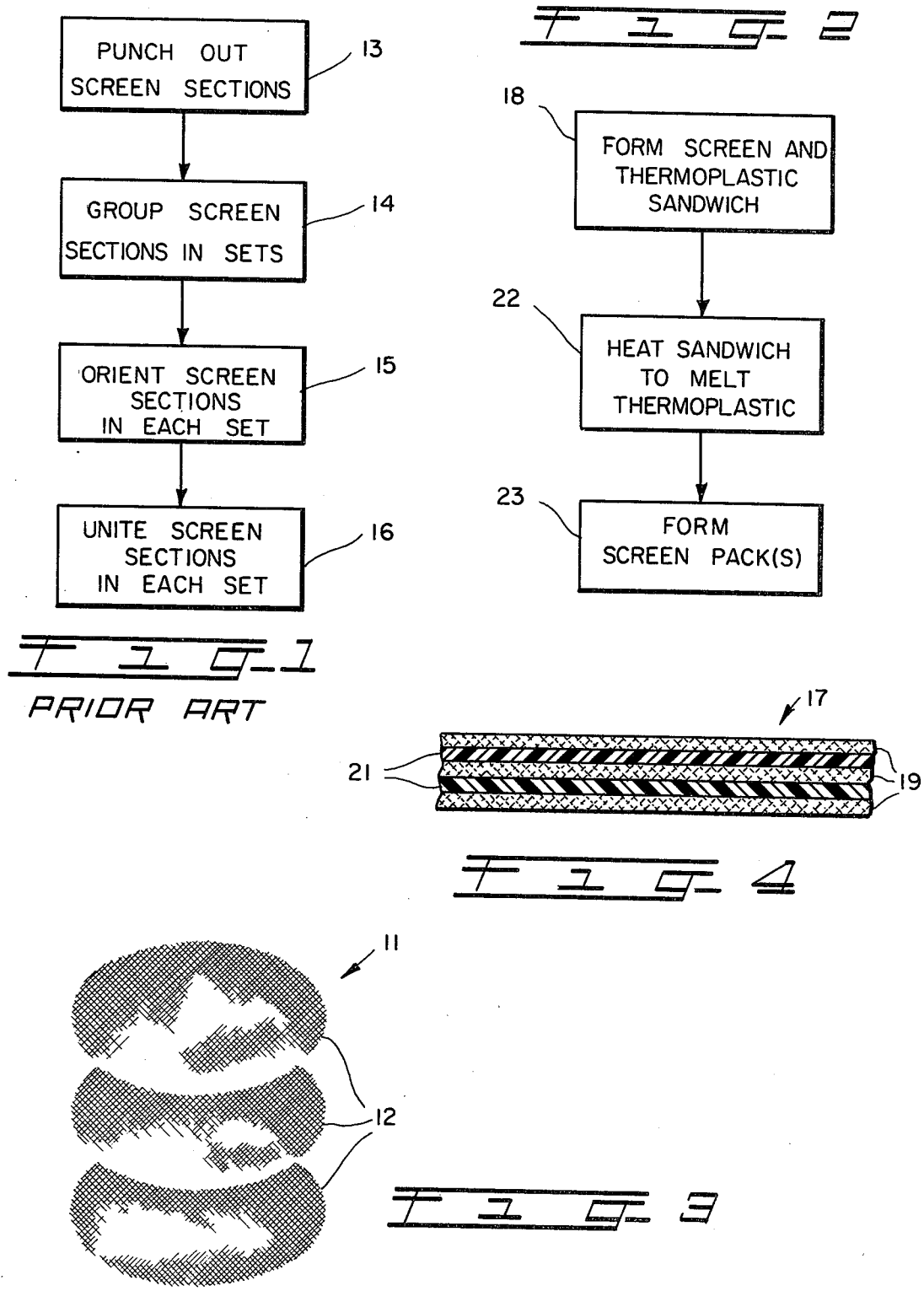

METHOD OF FORMING SCREEN PACKS

BACKGROUND OF THE INVENTION

1. Field of the Invention

This invention relates to methods for forming one or more screen pack assemblies for use in filtering operations and, more particularly, to methods for forming one or more screen packs which may be employed in filtering out foreign matter during the extrusion or other processing of plastic materials.

2. Description of the Prior Art

The use of screen pack assemblies as filtering agencies, e.g., for filtering out foreign matter from extruded plastic materials, is known. Such screen packs are composed of a number of typically circular, screen sections, e.g., three, which are suitably oriented with each other, and which together form a single, united structure.

Screen packs have previously been formed by first punching out a number of circular sections from a sheet of screening; then grouping the screen sections in sets, e.g., of three screens each; orienting the screen sections in each set with one another; and thereafter uniting the screen sections in each set into a single screen pack assembly, e.g., by spot welding operations or by securing a retaining ring about the circumference of each set of screen sections. Such technique for forming screen packs is slowed down considerably by the need for numerous, successive, screen section grouping, orienting and uniting operations. Thus, the provision of a faster, more efficient technique for assembling a screen-pack type filtering agency, avoiding the repetitive, time-consuming, grouping-orienting-uniting sequence after formation of the screen sections, is considered quite desirable.

Agencies other than screen packs, which serve to filter out foreign matter from extruded, or otherwise formed, plastic material, are also known. Thus, sand and similar particulate materials have been employed for filtering purposes. The sand may initially be bound together by a plasticizing agent or a thermoplastic material, as taught by U.S. Pat. Nos. 2,607,954 and 3,630,384 to G. Schneider et al. and H. Toda, respectively. The use of sand as a filtration medium is considered disadvantageous, however, due to the fact that sand based filters provide the equivalent of extremely fine mesh screens, removing very minute particles from the plastic materials being filtered, but also tending to become rapidly clogged by such particles. Thus, the frequency of filter-changing operations need be greatly increased if sand is to be substituted for screening as a filtration medium.

SUMMARY OF THE INVENTION

The invention contemplates methods of manufacturing screen packs in a relatively quick, efficient and inexpensive manner, through the performance of an initial step of forming a sandwich array which comprises a plurality of sheets of screening, with each sheet of screening having a predetermined orientation with respect to each other sheet of screening. The sandwich array also includes at least one sheet of thermoplastic material. Preferably, each sheet of screening in the sandwich array is separated from each adjacent sheet of screening in the sandwich array by a sheet of thermoplastic material.

The sandwich array is next heated so as to cause the thermoplastic material to flow into the openings of the sheets of screening, so that the sandwich array will constitute a unitary structure upon the cooling of the thermoplastic material. The flowing of the hot, thermoplastic material into the openings in the sheets of screening may be assisted by the application of a pressure differential, involving either relative vacuum or an elevated pressure, across the sandwich array.

The cooled, unitary structure is then subjected to a forming operation, so as to produce at least one screen pack from the unitary structure. Preferably, several such screen packs are formed simultaneously, e.g., through the performance of a punching operation on the unitary structure.

DESCRIPTION OF THE DRAWINGS

FIG. 1 of the drawing is a flow chart illustrating a prior art method of forming screen packs;

FIG. 2 is a flow chart illustrating an improved method of forming screen packs in accordance with the principles of the invention;

FIG. 3 is an exploded isometric view showing a typical screen pack assembly; and FIG. 4 is a side elevational view of a portion of a sandwich array which may be formed in the course of performing the method outlined in the flow chart of FIG. 2.

DETAILED DESCRIPTION

Referring initially to FIGS. 1 and 3 of the drawing, a prior art technique for forming screen pack assemblies, such as the screen pack 11 of FIG. 3, is outlined in the flow chart of FIG. 1. As a first step in such technique, a plurality of typically circular screen sections 12 are punched out of a sheet of screening (Block 13). The screen sections 12 are then grouped, e.g., in sets of three screen sections 12 each (Block 14); are oriented so as to align the mesh of the various screen sections 12 with a desired orientation for each (Block 15); and are united into a single screen pack assembly 11 (Block 16), e.g., by spot welding operations or by securing a retaining ring (not shown) about the circumference of each set of screen sections 12. Such prior art technique, while effective to produce suitable screen packs 11, is considered unduely time-consuming, due to the required repetitions of the grouping, orienting and uniting operations (Blocks 14, 15 and 16) in order to form successive screen packs 11 from the previously punched-out screen sections 12 (Block 13).

Turning next to FIGS. 2 and 4 of the drawing, an improved technique for forming the screen packs 11, which improved technique illustrates the principles of my invention, is outlined in the flow chart of FIG. 2. As a first step in this technique, a sandwich array, such as the sandwich array 17, a portion of which is depicted in FIG. 4, is formed (Block 18). The sandwich array 17 is composed of a number of sheets of screening 19, e.g., three sheets of screening 19, together with at least one sheet of a thermoplastic material 21. The screening material may be steel, while the thermoplastic material 21 may be any compatible plastic. Preferably, each sheet of screening 19 in the sandwich array 17 is separated from each adjacent sheet of screening 19 in the sandwich array 17 by a sheet of the thermoplastic material 21. Each such sheet of screening 19 has a predetermined orientation with respect to each other sheet of screening 19. Thus, all of the sheets of screening 19 in the sandwich array 17 may have a like orientation. Alternatively, at least one of the sheets of screening 19 may have an orientation which differs from that of at least one other of the sheets of screening 19 in the sandwich array 17.

The sandwich array 17 is next heated, e.g., by conduction, so as to cause the thermoplastic material 21 to melt, and to flow into the openings in the sheets of screening 19 (Block 22). Such flowing of the hot, thermoplastic material 21 into the openings in the sheets of screening 19 is preferably assisted by the application of a pressure differential across the sandwich array 17. The pressure differential may be provided either by a source of relative vacuum, or by a source of elevated pressure, such as an appropriately connected pump (not shown). The entry of the hot, thermoplastic material 21 into the openings in the sheets of screening 19 is desired in order to cause the sandwich array 17 to constitute a unitary structure upon the cooling of the thermoplastic material 21, with the cooled, resolidified, thermoplastic material 21 serving to bind together the sheets of screening 19.

After the cooling of the thermoplastic material 21, one or more screen packs 11, each of which includes a number of screen sections 12, e.g., three, may be formed from the unitary structure (Block 23). Preferably, numerous such screen packs 11 are produced simultaneously from the unitary structure, e.g., by the performance of punching operations on the unitary structure.

After the formation of the screen packs 11, as described with reference to FIGS. 2 and 4 of the drawing, a completed screen pack 11 may be inserted into a suitable filtering mechanism having clamping facilities for retaining the screen sections 12 of the screen pack 11 together even in the absence of the thermoplastic binder material 21. An initial extrusion operation, or other similar operation, involving the directing of a molten plastic material at the screen pack 11, will reheat the thermoplastic material 21 within the screen pack 11 and cause the reheated, thermoplastic material 21 to be forced out of the openings in the screen sections 12 of the screen pack 11. Thus, the screen pack 11 will enter immediately into a condition suitable for filtering foreign matter from the extruded plastic material.

It is to be understood that the described methods are simply illustrative of a preferred embodiment of the invention. Many modifications may, of course, be made in accordance with the principles of the invention.

What is claimed is:

1. A method of simultaneously forming a plurality of flat screen packs for use in filtering out foreign matter from an extruded plastic material, each screen pack including a plurality of flat, parallel-extending, metal screens, the method comprising the steps of:
   (a) forming a flat sandwich array comprising a plurality of flat sheets of metallic screening, each sheet of screening having a predetermined orientation with respect to each other sheet of screening, with each flat sheet of screening being separated from each adjacent, flat sheet of screening by a flat, continuous sheet of a thermoplastic material, said thermoplastic material being compatible with an extruded plastic material which is to be subjected to filtration through the plurality of flat screen packs such that, upon the directing of the extruded plastic material, in molten condition, at each screen pack, the thermoplastic material will be heated and forced out through the openings in the screen pack screens by the molten, extruded plastic material;
   (b) heating the entire sandwich array; while also
   (c) applying a pressure differential across the sandwich array sufficient to cause the heated thermoplastic material to flow into the opening in the sheets of screening;
   (d) terminating the heating while maintaining the sandwich array such that the sandwich array becomes a unitary structure of sheets of screening bound together by the flowed thermoplastic material upon cooling of the thermoplastic material; and
   (e) forming a plurality of flat screen packs simultaneously from said unitary structure, with each of the flat screen packs held together by the cooled thermoplastic material between adjacent sections of screening and within the openings of the adjacent sections of screening.

2. A method as set forth in claim 1, further comprising the subsequent steps of:
   (f) clamping at least one of the flat screen packs in a filtering mechanism; and
   (g) directing said extruded plastic material, in molten condition, at the clamped screen pack, thereby reheating the thermoplastic material in the clamped screen pack and forcing the reheated thermoplastic material out through the openings in the screen pack screens.

3. A method as set forth in claim 1, wherein step (a) comprises:
   (f) forming the sandwich array with all of the sheets of screening having a like orientation.

4. A method as set forth in claim 1, wherein step (a) comprises:
   (f) forming the sandwich array with at least one of the sheets of screening having an orientation which differs from the orientation of at least one other of the sheets of screening.

5. A method as set forth in claim 1, wherein step (c) comprises:
   (f) applying a relative vacuum across the sandwich array.

6. A method as set forth in claim 1, wherein step (c) comprises:
   (f) applying an elevated pressure across the sandwich array.

7. A method as set forth in claim 1, wherein step (e) comprises:
   (f) punching a plurality of screen packs simultaneously from said unitary structure.

* * * * *

UNITED STATES PATENT OFFICE
CERTIFICATE OF CORRECTION

PATENT NO. : 4,138,303
DATED : February 6, 1979
INVENTOR(S) : J. J. TAYLOR, SR.

It is certified that error appears in the above-identified patent and that said Letters Patent are hereby corrected as shown below:

In the title page, add --Assignee: Western Electric Company, Incorporated--.

In the specification, column 1, line 38, "material" should read --materials--.

In the claims, claim 1, column 4, line 12, "opening" should read --openings--.

Signed and Sealed this

Twenty-second Day of May 1979

[SEAL]

Attest:

RUTH C. MASON
Attesting Officer

DONALD W. BANNER
Commissioner of Patents and Trademarks